(No Model.)
J. P. A. WILLIAMS.
PROCESS OF AND APPARATUS FOR THE MANUFACTURE OF DIPPED CANDIES.
No. 279,209. Patented June 12, 1883.
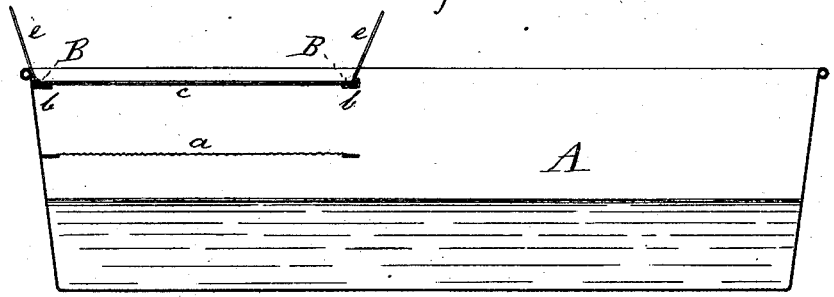
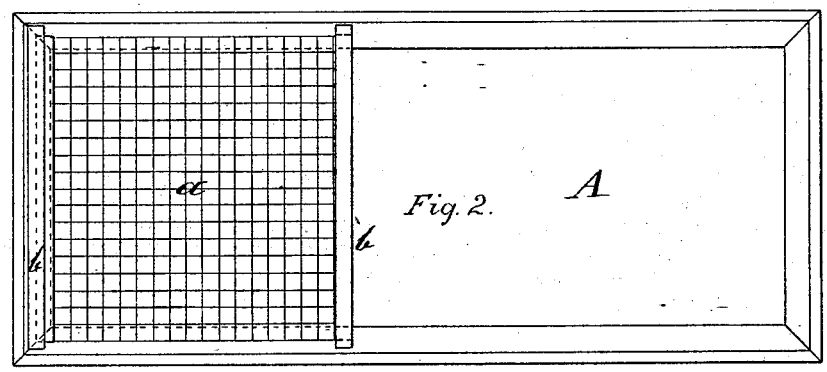
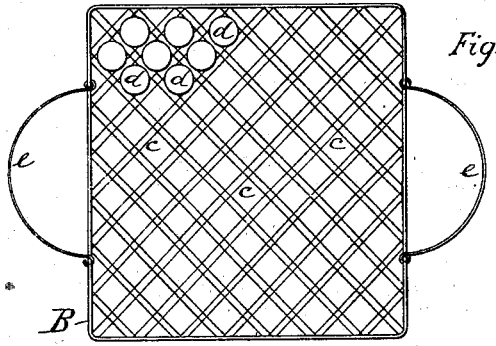
WITNESSES:
INVENTOR
BY
ATTORNEY

UNITED STATES PATENT OFFICE.

J. P. AUGUSTE WILLIAMS, OF CHICAGO, ILLINOIS.

PROCESS OF AND APPARATUS FOR THE MANUFACTURE OF DIPPED CANDIES.

SPECIFICATION forming part of Letters Patent No. 279,209, dated June 12, 1883.

Application filed April 11, 1883. (No model.)

*To all whom it may concern:*

Be it known that I, J. P. AUGUSTE WILLIAMS, a citizen of the United States of America, residing at Chicago, in the county of Cook and State of Illinois, have invented certain new and useful Improvements in Process of and Apparatus for the Manufacture of Dipped Candies, of which the following is a specification, reference being had therein to the accompanying drawings.

Heretofore candies were coated with chocolate or other concentrated solutions by dipping each piece separately while holding it between the fingers, which not only was a slow process, but also left the finger-marks on the coating; and it is my object to produce a device that will not only facilitate and accelerate the manipulations, but will effect the coating of such candies without the necessity of touching the same with the fingers.

Therefore my invention consists of the process and apparatus hereinafter described and specifically claimed.

In the accompanying drawings, Figure 1 represents a longitudinal vertical section of the apparatus complete; Fig. 2, a plan of the same, the dipping-frame being removed; Fig. 3, a plan of the dipping-frame, showing a few of the candies placed thereon; and Fig. 4, the dipper or spoon for pouring the solution over the candies.

Corresponding letters in the several figures of the drawings designate like parts.

A denotes a rectangular metal pan, of any usual shape or construction, that has to one end a rigid shelf, $a$, of wire-screening. To near the top edge of pan A are secured two cross-bars, $b$, that are located above the ends of shelf $a$.

B is a square frame of heavy wire, over which are stretched diagonally a series of fine wires, $c$, that are arranged in pairs, rectangularly cross each other, and are interwoven to form a multitude of square meshes separated from each other in a manner that pieces $d$ of round or oval candies placed one in each such mesh will not touch each other. This frame B has to each end a bail or handle, $e$.

D is a dipper or spoon of any common construction.

The *modus operandi* is as following, to wit: Chocolate, or other concentrated solution that is to crust the candies is filled into the bottom of pan A, and is kept in a liquid condition by heating. Candies of any usual shape and size are placed upon the frame B, one on each of the meshes, then by holding such frame on its bails or handles $e$, it is dipped into the solution at the open side of the pan just sufficiently to immerse the bottom surface of the candies supported thereon. Next the frame B is placed upon cross-bars $b$, and solution is poured over the top of each candy by means of the dipper. The candies being cold, a thin coating of the solution that sticks to them will chill and harden at once, while the surplus will run down between the wires back into the pan. As soon as the candies have thus been crusted a sheet of paper is spread over them, and while held to the frame B, such frame is turned upside down upon a table or board and then removed, when the candies will remain on the paper, and the frame B can be used again for dipping the next lot. Any candies dropping through the meshes of frame B during the operation of pouring the solution over them will fall upon the screen $a$, whence they can be picked up, thus obviating their dropping into the solution; but this shelf $a$ may be dispensed with.

As will be noticed, this device is very simple, and not only accelerates the process and operation to a great extent, but furnishes a more perfect article as well.

What I claim is—

1. The process of manufacturing dipped candies herein described, consisting in distributing the candies upon a wire frame, in coating the bottom surface by dipping into the solution and their top surface by pouring the solution over the same, and in depositing such candies upon sheets of paper by reversing such frame, all substantially as set forth.

2. The apparatus herein described for dipping candies, consisting of pan A, having cross-bars $b$, in combination with frame B, having wires $c$ and bails or handles $e$, all substantially as and for the purpose set forth.

3. The apparatus herein described for dipping candies, consisting of pan A, having screen-shelf $a$ and cross-bars $b$, in combination with frame B, having wires $c$ and bails or handles $e$, all substantially as and for the purpose set forth.

In testimony whereof I affix my signature in presence of two witnesses.

J. P. AUGUSTE WILLIAMS.

Witnesses:
LOUIS NOLTING,
ADAM GEO. WHITE.